Figure 1:
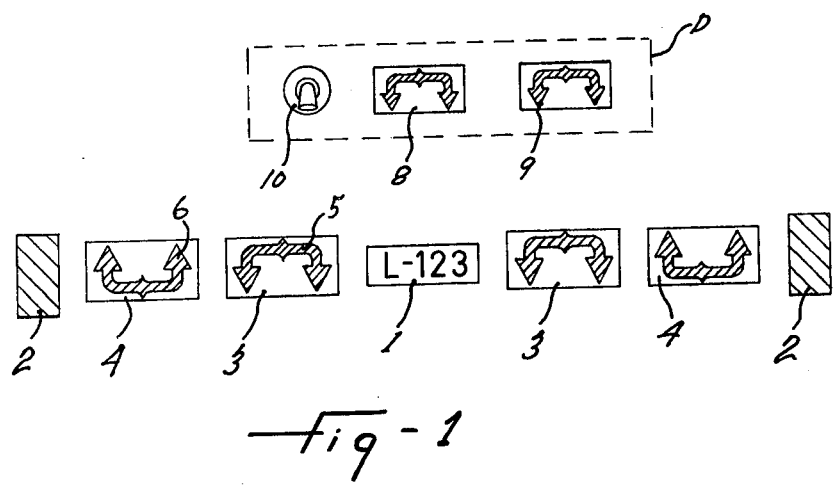

United States Patent [19]

Courty

[11] 4,037,197
[45] July 19, 1977

[54] AUTOMOBILE HIGH BEAM GLARE WARNING DEVICE

[76] Inventor: Aurèle Courty, 471 St. Madeleine Street, Montreal, Quebec, Canada

[21] Appl. No.: 655,378

[22] Filed: Feb. 5, 1976

[51] Int. Cl.$^2$ .......................... B60Q 1/46; B60Q 1/26
[52] U.S. Cl. ...................................... 340/107; 340/76; 340/80
[58] Field of Search ...................... 340/107, 80, 79, 76

[56] References Cited

U.S. PATENT DOCUMENTS

| | | | |
|---|---|---|---|
| 1,580,766 | 4/1926 | Schlotterbeck | 340/107 |
| 2,050,769 | 8/1936 | Stone | 340/107 |
| 2,477,022 | 7/1949 | Volk | 340/107 |
| 2,803,811 | 8/1957 | Turney | 340/80 |
| 2,878,462 | 3/1959 | Tralli | 340/107 |
| 3,678,457 | 7/1972 | Lev | 340/107 |

*Primary Examiner*—Donald J. Yusko

[57] ABSTRACT

Lighted information panels located at the rear end of an automobile, arranged in two sets: one set lighting red to indicate to the following driver that the preceding driver has his high beam lights on and the other set lighting green to indicate to the following driver that the low beam lights are on and also capable of flashing to attract the attention of the following driver who will, in response, dim his high beam lights, so as to prevent blinding of the preceding driver.

2 Claims, 2 Drawing Figures

AUTOMOBILE HIGH BEAM GLARE WARNING DEVICE

The present invention relates to an automobile high beam glare warning device and has for his main object the diminution of the risks of accidents when driving at night, caused by the glare of the high beams of a following automobile.

A more specific object of the invention resides in the provision of an electrical system adapted to be mounted on automobiles, including lighted information panels located on the rear end of the automobile and indicating to the following driver, by means of flashing lights, that his high beams are blinding the preceding driver.

Another object of the invention resides in the provision of two sets of lighted information panels, of different colors, located at the rear end of the automobile indicating to the following driver that one's high beams or low beams are on, so that the following driver may govern himself accordingly.

Other objects of the invention are the provision of an electric lighting system of the character described incorporating additional lights adapted to be mounted on the dashboard of the automobile and indicating the state of operation of the system.

Another object of the invention is the provision of a system of the character described, which can be mounted on existing automobiles without modifying the elcetrical circuit of the same.

Figure 2:
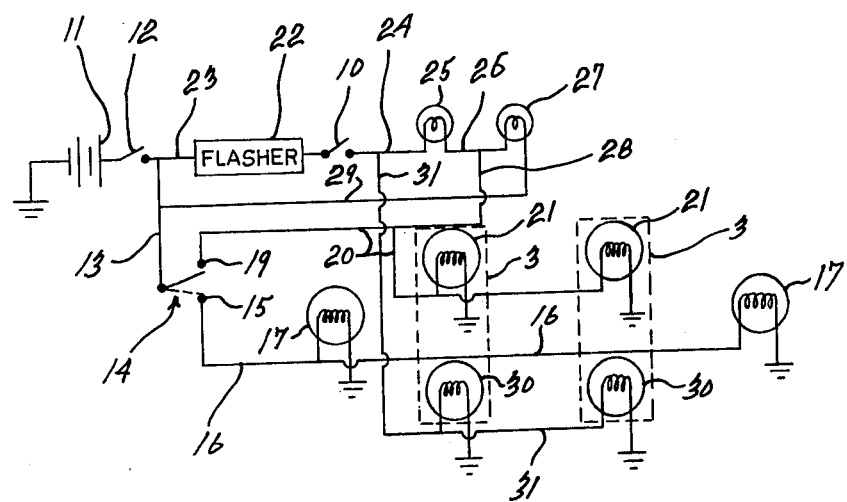

The foregoing and other objects of the invention will become more apparent during the following disclosure and by referring to the drawings, in which:

FIG. 1 is a schematic view of the lighted information panels on the dashboard and at the rear end of the automobile; and FIG. 2 is a schematic electrical circuit of the system of the invention.

In the drawings, like reference characters indicate like elements throughout.

Referring to FIG. 1, the rear end of an automobile has provision for the mounting of a license plate 1 and the usual two combined direction indicating and parking lights 2. The lighted information panels in accordance with the invention are preferably on each side of the license plate 1 and between the same and the respective parking lights 2.

The information panels 3 in accordance with the present invention are nearer the license plate and are adapted to light a green color to show to the following driver that the low beams of the automobile are on. Lighted information panels 4 mounted symmetrically on the outside of panels 3 are adapted to light a red color to indicate to the following driver that one's high beams are on.

Panels 3 and 4 are preferably provided with a symbol, for instance arrows 5 and 6, pointing downwardly and upwardly respectively to indicate a low beam and a high beam condition.

Panels 3, in addition to providing constant light for indicating low beam condition, can produce flashing green light to indicate to the following driver that his high beams are causing a nuisance or a glare, and to please dim his lights.

It is known that frequent accidents occur because of the glare of the high beams of a following driver.

FIG. 1 further shows additional smaller size information panels 8 and 9, respectively, adapted to be mounted on the dashboard D of the automobile and indicating in green that the rear panels 3 are lighted, and in red that the high beam panels 4 are lighted. The green dashboard panel 8 can also flash to indicate that the rear panels 3 are flashing.

The dashboard D further includes a manually-operated "on" and "off" switch 10 operated by the driver to flash his green light panels 3 and 8, whenever desired, to warn the following driver that his high beam lights cause a glare.

FIG. 2 is a diagram of the electrical circuit in accordance with the invention. The conventional car battery 11 is grounded on its negative side and connected on its positive side to the usual light switch 12, in turn connected in series by wire 13 to the conventional single pole double-throw dim switch 14, the contact 15 of which is connected in parallel by wire 16 to the high beam indicating light bulbs 17 illuminating the high beam information panels at the back of the motor vehicle.

The other contact 19 of the dim switch 14 is connected in parallel by wire 20 to the low beam indicating light bulbs 21 illuminating the low beam information panels 3 at the back of the motor vehicle. A flasher switch 22 is connected to switch 12 in parallel with wire 13 by means of wire 23. The dashboard-mounted manual switch 10 is connected in series with flasher switch 22 and by means of wire 24 with one terminal of a light bulb 25 serving to illuminate the dashboard-mounted low beam indicating panel 8.

A wire 26 is connected to the other terminal of light bulb 25 and also to one terminal of a light bulb 27 serving to illuminate the dashboard-mounted high beam indicating panel 9. Wire 26 is connected by wire 28 to wire 20, in turn connected to the low beam terminal 19 of the dim switch 14.

The other terminal of light bulb 27 is connected by wire 29 to wire 13. The low beam information panels 3 are further provided with light bulbs 30, respectively, connected in parallel by wire 31, itself connected to wire 24.

The circuit operates as follows:

Supposing the conventional light switch 12 is closed and dim switch 14 is in the high beam position closing contact 15, then bulbs 17 of the red color information panels 4 light up. This indicates to the following driver that one's high beams are on. At the same time, light bulb 27 of the dash-mounted high beam indicating panel 6 lights up through the following circuit: switch 12, wire 29, light bulb 27, wires 26, 28, 20 and ground through the filaments of the two light bulbs 21.

It will be noted that the filaments of the light bulb 21 have normally a lower resistance than the filament of light bulb 27 and are further mounted in parallel, so that the combined resistance is reduced to half.

The flash signal can be operated with the dim switch 14 in the high beam position. The operator closes switch 10 which operates the flasher light bulbs 30 through wire 31. This also causes flashing of the dash-mounted light bulb 25 through the following circuit: wire 24, light bulb 25, wire 28, wire 20 and light bulbs 21.

When the dim switch 14 is in the low beam position closing contact 19 with switch 10 open, the light bulbs 21 light up, indicating a low beam position through wire 20. Also, the dash-mounted low beam light bulb 25 lights up through the following circuit: wires 20, 28, wire 26, light bulb 25, wire 31 and light bulbs 30. Light bulb 27 does not light up because terminals are at the same voltage.

Upon closing of manual switch 10, the flasher switch 22 will operate, in intermittent manner, the light bulbs 30 through wire 31. Also, the light bulb 25 will flash but in alternate sequence with light bulbs 30. When the flasher switch 22 is in "on" position, light bulbs 30 light up but not light bulb 25, because the latter is subjected to equal voltage on both terminals through wire 24 on the one hand and through the wires 26, 28, contact 19, and wire 13 on the other hand. When the flasher switch 22 is off, light bulb 25 lights up through the circuit: wire 13, contact 19, wire 28, light bulb 25, wires 24, 31 and light bulbs 30.

The circuit arrangement of the invention allows to use a minimum number of wires; to mount the light bulbs 25 and 27 on the dash in insulated manner; to be able to use a non-expensive single pole single-throw switch 10 as a manual switch on the dashboard. Furthermore, it allows to flash the green lights at the back of the vehicle, even when the high beam red lights are on.

What I claim is:

1. A signalling system to equip an automobile fitted with an electrical circuit including high beam and low beam head lamps and a dim switch having a low beam contact and a high beam contact to selectively energize said head lamps, this system adapted to signal to the driver of a following automobile which of the high beam and low beam of the preceding automobile are on and to give a flashing warning to the driver of the following automobile that the high beam of the following automobile causes glare to the driver of the preceding automobile, said system comprising in addition to the usual parking and direction indicating lights, low beam information panel and high beam information panel mounted at the back of the preceding automobile, first and second light bulbs for illuminating said low beam information panels, third light bulbs for illuminating said high beam information panels, an electrical circuit for selectively energizing said first light bulbs including a flasher device and a manually-operated switch series-connected in the circuit of the first light bulbs to cause intermittent illumination of said low beam panels to signal to the driver of the following automobile that the high beams of said following automobile are causing a glare to the driver of the preceding automobile, the low beam and high beam contacts of said dim switch being connected to said second light bulbs and to said third light bulbs, respectively, so as to illuminate in a continuous manner the low beam information panels and the high beam information panels, respectively, to indicate to the driver of the following automobile which of the high beam and low beam of the preceding automobile are on.

2. A signalling system as claimed in claim 1, further including a low beam display panel and a light beam display panel mounted in the dashboard of the preceding automobile, each including a pilot light for illuminating the respective display panels, a common wire interconnecting one terminal of each last-named light bulbs, said common wire connected to the low beam contact of the dim switch, the other terminal of the low beam pilot light connected to the input of the first light bulbs, the other terminal of the pilot light of the high beam display panel being connected directly to the input of the flasher device and of the dim switch, whereby said low beam indicating pilot lights is flashing when said first lights are flashing and is continuously illuminated when said second lights are on and is off when said first and second lights are off, and whereby said high beam indicating pilot light is on only when said third lights are on.

* * * * *